United States Patent [19]
Lange

[11] 3,712,201
[45] Jan. 23, 1973

[54] CONTROL MECHANISM FOR CAMERAS

[75] Inventor: Karl-Heinz Lange, Bunde, Germany

[73] Assignee: Balda-Werke, Postfach, Germany

[22] Filed: July 8, 1971

[21] Appl. No.: 160,673

[30] Foreign Application Priority Data

Aug. 13, 1970 Germany..................P 20 40 283.9

[52] U.S. Cl. ....................95/39, 95/11 R, 95/53 R
[51] Int. Cl. ....................G03b 17/04, G03b 19/00
[58] Field of Search........95/39, 32, 53 R, 53 B, 11 R

[56] References Cited

FOREIGN PATENTS OR APPLICATIONS

| | | | |
|---|---|---|---|
| 1,084,586 | 9/1967 | Great Britain | 95/53 R |
| 898,193 | 6/1962 | Great Britain | 95/53 R |

*Primary Examiner*—Robert P. Greiner
*Attorney*—Alex Friedman et al.

[57] ABSTRACT

A control mechanism for cameras. The control mechanism includes an actuating component for actuating part of the camera as well as a manually operable component to be moved by the operator. A motion-transmitting structure transmits motion from the manually operable component to the actuating component only when the manually operable component is displaced from a rest position to an operative position. A locking structure releasably holds the manually operable component in its inoperative position while the manually operable component can be actuated to release the locking mechanism so that the manually operable component can move to its operative position. The locking mechanism when moving to its unlocking position actuates the motion-transmitting element to assume a position where subsequent manipulation of the manually operable component will bring about movement of the actuating component so as to produce the required movement of a camera component.

7 Claims, 7 Drawing Figures

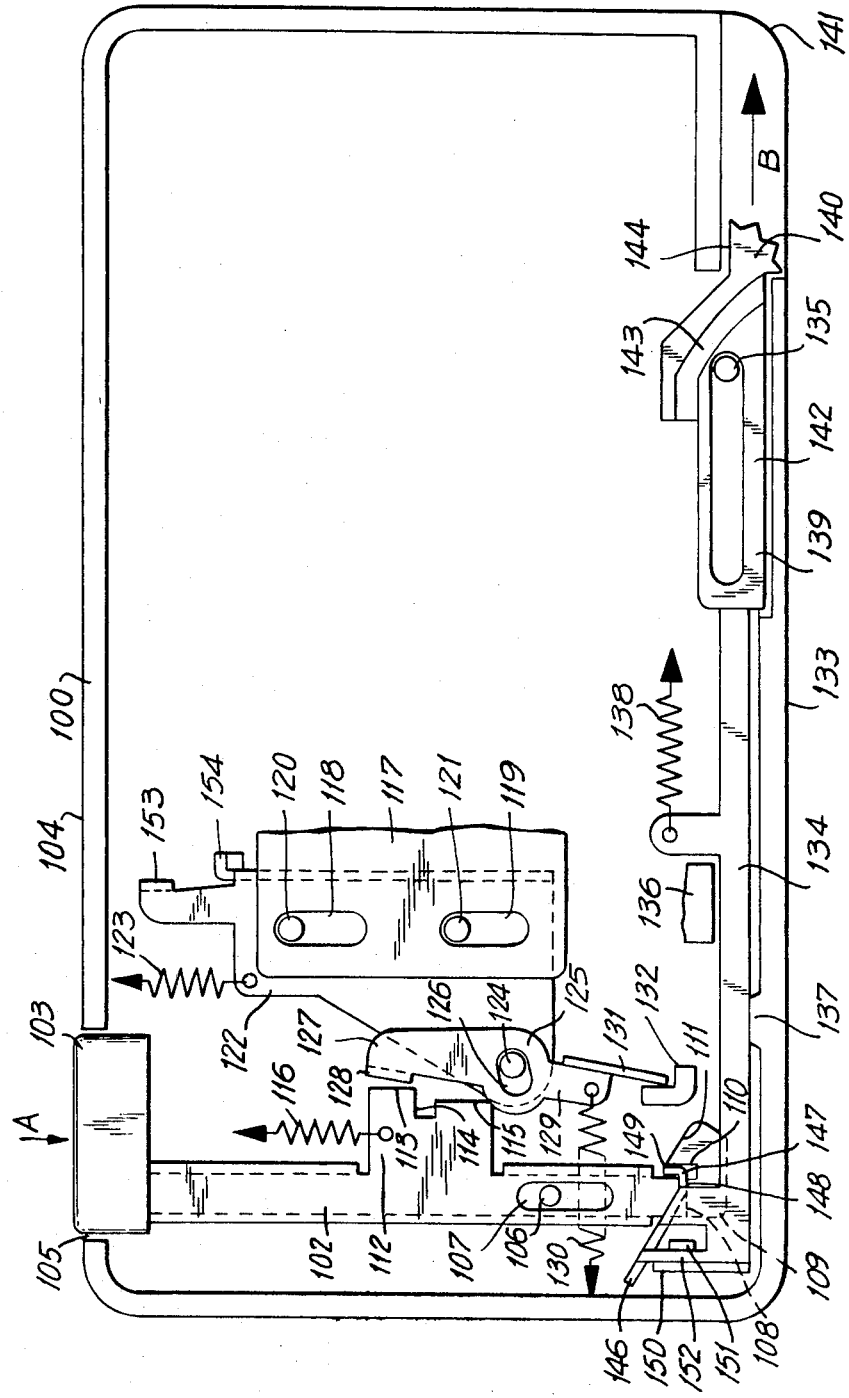

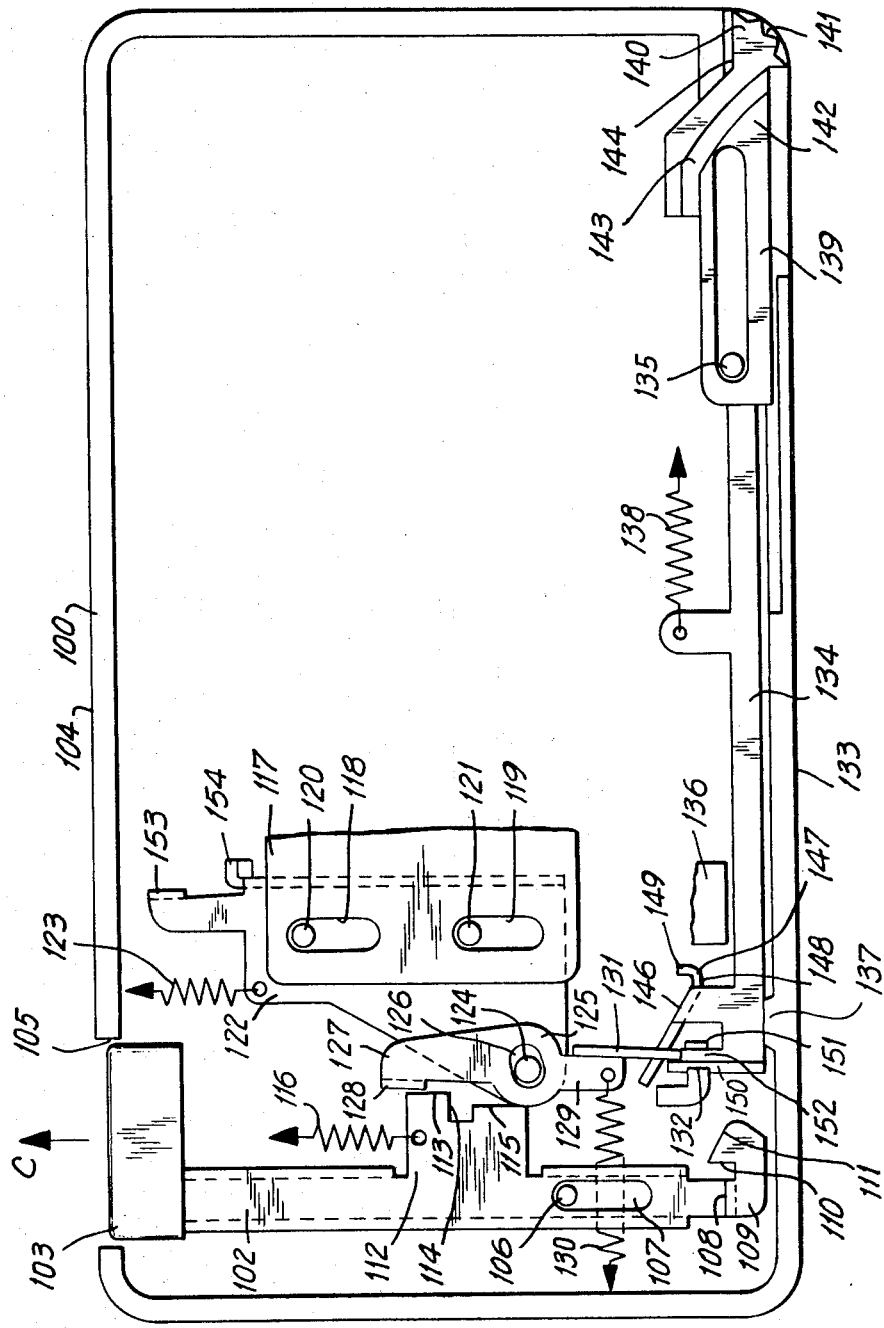

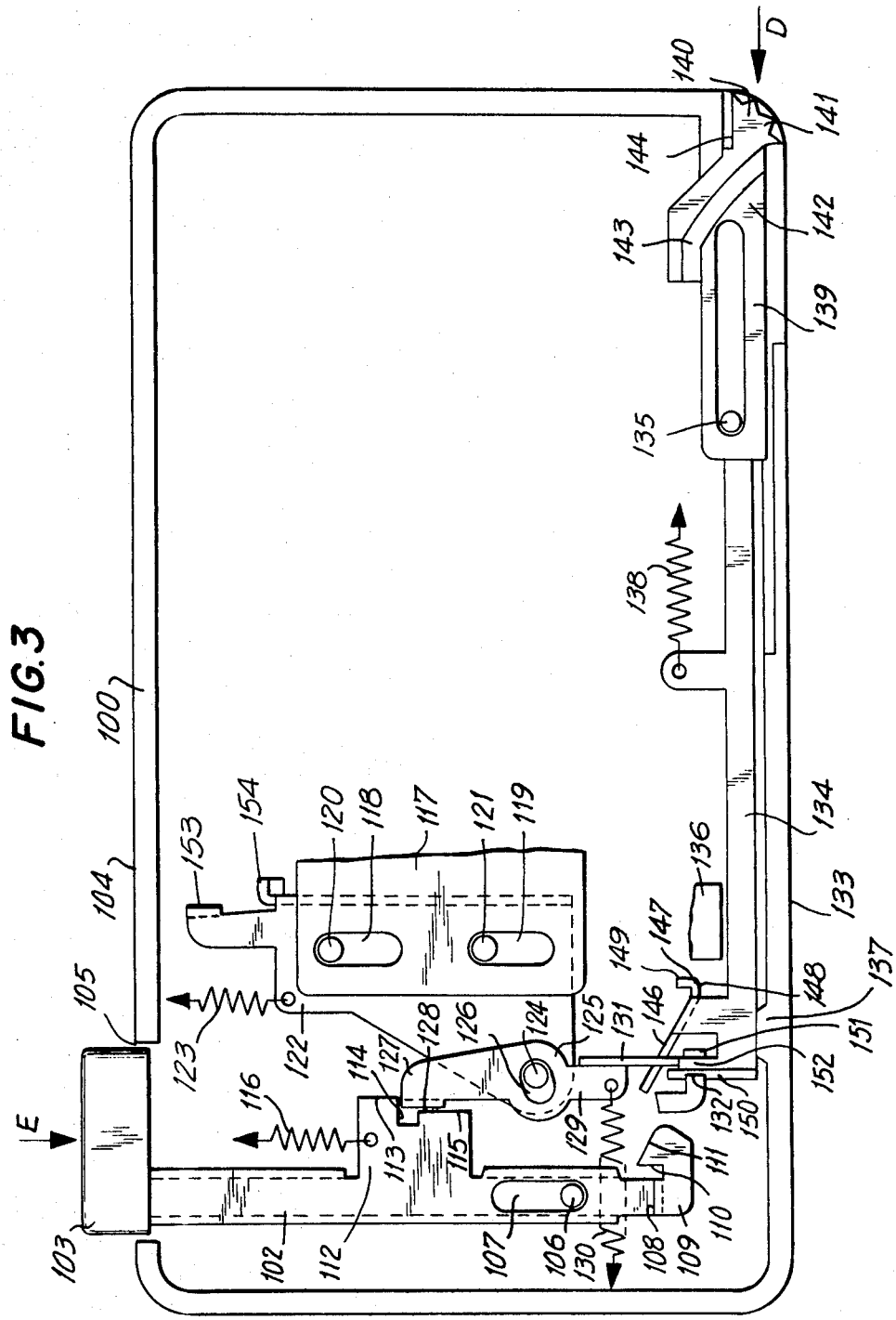

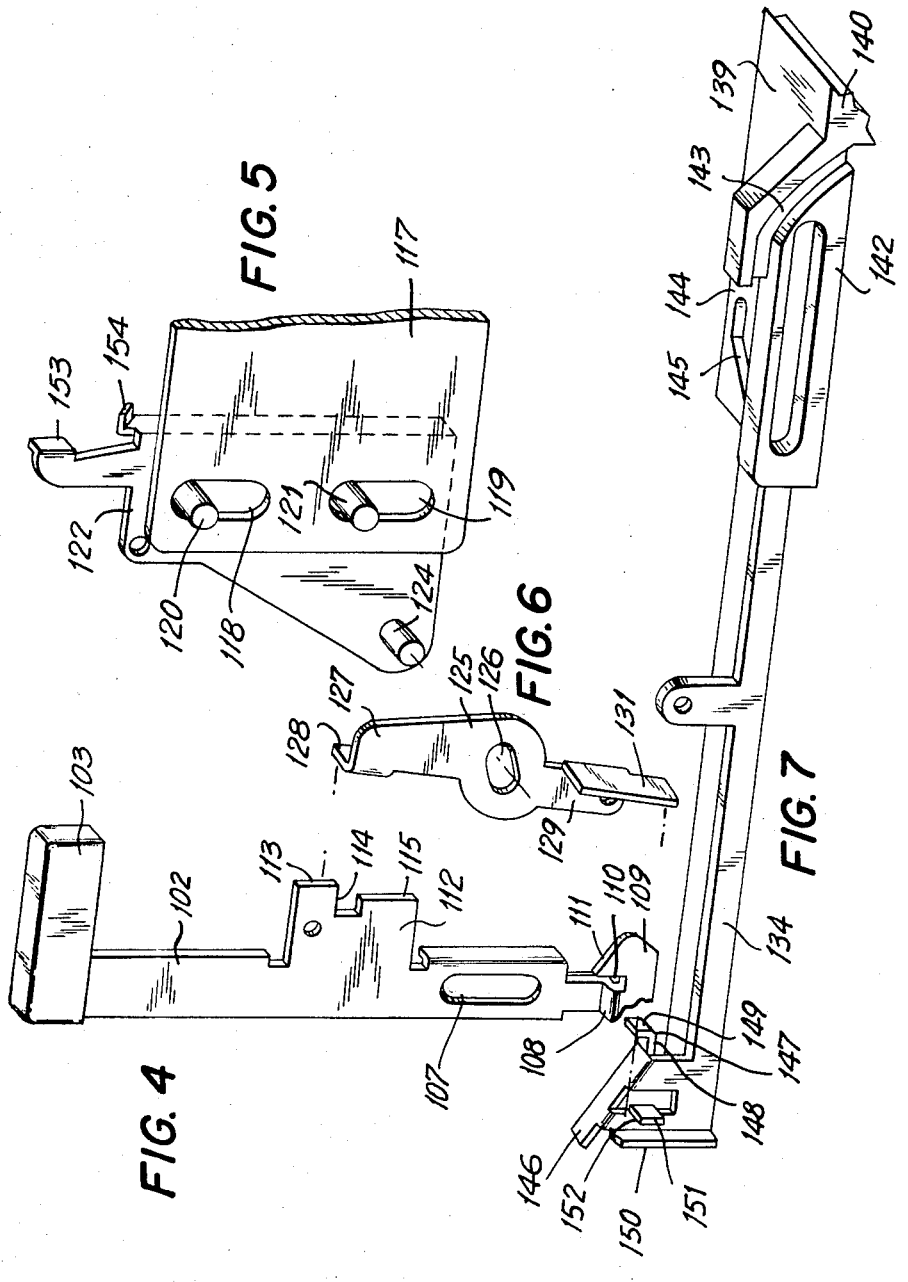

3,712,201

CONTROL MECHANISM FOR CAMERAS

BACKGROUND OF THE INVENTION

The present invention relates to cameras.

In particular, the present invention relates to camera control structures capable of controlling camera components in such a way that a predetermined sequence of operation will be assured.

For example, the present invention is applicable to that type of camera where an objective carrier is retractable toward the interior of the camera to an inoperative position where the camera will have a particularly thin configuration. In order to render the camera useful the objective carrier must be displaced to an outer operative position. This objective carrier when retracted to its inoperative position is covered by a shiftable cover plate, and the objective carrier and cover plate must be moved in a predetermined sequence one with respect to the other so that the movement of these parts will not interfere with each other while permitting the desired camera operation to take place.

At the present time structures such as a shiftable objectable carrier and shiftable cover plate are controlled in the predetermined sequence with exceedingly complex mechanisms which do not operate reliably at all times in order to bring about the desired results. For example, with certain previously proposed constructions the objective carrier will first be moved part of the way toward its operative position when the camera is manipulated to release the objective in order to make an exposure, and only upon release of a manually operable component will the objective carrier be capable of displacing the objective all the way to its outer operative position. Thus, a previously known construction has a cam operatively connected with a manually operable release member in such a way that the cam is connected to the manually operable release element through a pivotally connected release rod which has a free end carrying an engaging pin which extends through an approximately triangular or Z-shape opening of the shiftable cam into a guide channel of a guide plate. The release rod is under the influence of a spring and seeks to displace the manually operable release component to an open position where it extends outwardly beyond its rest position in the manner of a hinged plate beyond the exterior surface of the camera. This position is determined by a U-shaped guide surface which forms a stop for the engaging pin of the release rod.

This type of construction has proved to be unsatisfactory because when the operator of the camera actuates the release component in order to attempt to place the camera in its operative position and then does not immediately release the release component, the tube carries the objective remains in a position displaced only part of the way toward its outer operative position, since the engaging pin still is situated within a part of the guide channel which prevents the objective from being displaced all the way to its operative position. Only after release of the manually operable release component is it possible for the guide pin to be displaced by the spring to a part of the guide channel where it now becomes possible for the objective carrier to move all the way to the outer operative position.

This type of interrupted displacement of the objective carrier can, of course, result in an improper impression that the camera is operating defectively, particularly if the operator does not understand the interior mechanism of the camera. Moreover, because of the hinge-like swinging movement of the manually operable element to its operative position outwardly beyond the exterior surface of the camera, it can easily happen that when this element is returned to its inoperative position parts of clothing or a glove or the like will be clamped between the exterior surface of the camera and the manually operable component.

SUMMARY OF THE INVENTION

It is accordingly a primary object of the invention to provide a structure which will avoid the above drawbacks.

In particular, it is an object of the invention to provide a structure which not only will avoid the above drawbacks but which at the same time will provide a simplified type of operation with an increased reliability in the operation of the component.

Furthermore, it is an object of the present invention to provide controls for cameras of the above general type which will make it possible to provide for cameras of this type electrical structures and structures such as flash cubes which are automatically turned for positioning flash lamps sequentially in operating positions.

In particular, it is an object of the present invention to provide a structure which responds to manual operation in such a way that transmission of movement to camera components is achieved only when a manually operable element has been displaced to a predetermined operative position while at the same time preventing return of components to their rest positions until the required operations have been completed.

In particular, it is an object of the present invention to provide a construction which will enable transmission of motion of a manually operable element to a camera actuating structure to be achieved only when certain previous operations have properly taken place.

According to the present invention the camera structure includes an actuating means supported for movement by a suitable support means for actuating camera structure. A manually operable means is also carried by the support means for movement between an inoperative position and an operative position. A motion transmitting means is provided for transmitting motion from the manually operable means to the actuating means only after the manually operable means has been displaced to its operative position. The manually operable means is releasably held in its inoperative position by a releasable lock means which can only travel to its unlocking position when the manually operable means is preliminarily actuated. This releasable lock means when moving toward its unlocking position actuates the motion-transmitting means to place the latter in a position where it will transmit motion from the manually operable means to the actuating means only after the manually operable means has moved to its operative position. This motion-transmitting means preferably takes the form of a two-armed lever which is connected by a connecting means to the actuating means in such a way that this lever is both shiftable and swingable on the actuating means. The lock means when released by the manually operable means first shifts the motion-transmitting means with respect to the actuating means into engagement with the manually operable means and then when the latter moves out to its operating position a projection of the manually operable means is capable of cooperating with the motion-transmitting means to act through the latter on the actuating means to move the latter with respect to the support means.

BRIEF DESCRIPTION OF THE DRAWING

The invention is illustrated by way of example in the accompanying drawings which form part of this application and in which:

FIG. 1 shows in elevation the structure according to the present invention in its position of rest, the structure being shown in FIG. 1 with a front wall of the camera removed;

FIG. 2 shows the structure of FIG. 1 with the part illustrated in the position they take after the manually operable means has been initially depressed for releasing a lock means;

FIG. 3 shows the structure of FIGS. 1 and 2 after the manually operable means has been moved up to its operating position subsequent to the position of the part shown in FIG. 2;

FIG. 4 is a perspective illustration of the manually operable means;

FIG. 5 is a perspective illustration of the actuating means;

FIG. 6 is a perspective illustration of the motion-transmitting means; and

FIG. 7 is a perspective illustration of the lock means.

DESCRIPTION OF THE PREFERRED EMBODIMENTS

Referring now to FIG. 1, part of a camera housing 100 is illustrated therein, the front wall of the camera housing being removed so as to clearly illustrate the structure which is shown in FIG. 1. The camera housing forms a support means which supports for vertical movement a manually operable means 102 in the form of an elongated vertically shiftable member. At its top end the manually operable means 102 is provided with a manually-engageable key 103 which in the inoperative position of the manually operable means 102 extends only to a small extent beyond the exterior surface 104 of the camera, as illustrated in FIG. 1. The top wall 104 of the camera is provided with a opening 105 through which the element 103 is guided so as to provide in this way part of a structure for guiding the manually operable means 102. In addition the camera carries in its interior a stationary pin 106 extending into an elongated vertical slot 107 which is formed in the manually operable means 102 so that this structure 106, 107 also serves to guide the manually operable means 102 for vertical movement As is shown most clearly in FIG. 4, the manually operable means 102 is provided with a pair of mutually perpendicular stop and lock surfaces 108 and 110. Thus, the member 102 is bent so as to have a horizontally extending surface 108 which forms a lock surface which operates in a vertical direction. This lock surface 108 is joined to the upper end of a vertically extending wall portion 109 which extends parallel to the remainder of the element 102, as shown most clearly in FIG. 4.

This part 109 is shaped in such a way that it has the stop surface which is formed by the vertical edge 110 which operates in a horizontal direction. This stop surface 110 extends downwardly from an inclined surface 111 which extends along the upper portion of the wall 109 as shown most clearly in FIG. 4.

At its central region, for purposes of adding rigidity, the elongated manually operable means 102 has a U-shaped cross-section. Also, the intermediate portion of the manually operable means 102 has an extension 112 forming a projection which terminates in a vertical edge 113. This vertical edge 113 extends vertically from a horizontal edge 114 of the projection 112. Beneath the edge 114 the projection 112 is provided with a further vertical edge 115. A spring means 116 is operatively connected with the manually operable means 102 so as to tend to urge the latter toward the operative position illustrated in FIG. 3.

The support means of the camera includes a stationary plate 117 formed with a pair of elongated vertical slots 118 and 119 which respectively receive guide pins 120 and 121 affixed to and projecting from an actuating means which is formed by a plate 122 which is thus guided by the pins 120, 121 and the slots 118, 119 for vertical movement so as to bring about operation of camera components. A spring 123 urges the actuating means 122 upwardly to the position where the pins 120, 121 respectively engage the top ends of the slots 118, 119. This actuating means 122 is provided with lugs 153 and 154 shaped in such a way as to actuate, in a manner which is not further described, certain components such as shiftable and swingable release elements. Also, the actuating means 122 may serve to carry a tensioning lever which may have a function which does not form part of the present invention.

At its lower region the actuating means 122 carries through a connecting means a motion-transmitting means 125. The connecting means includes an elongated slot 126 formed in the lever 125 and a pin 124 fixed to the actuating means 122 and received in the slot 126, so that through this connecting means the lever 125 is both shiftable along and turnable about to the pin 124. This two-armed lever 125 forms a motion-transmitting means for transmitting motion from the manually operable means 102 to the actuating means 122 in a manner described in greater detail below.

The motion-transmitting lever 125 has at its upper arm 127 a lug 128 for coacting with the projection 112. At its lower arm 129 the motion-transmitting lever is connected with a spring 130 which seeks to pull the arm 129 to the left, as viewed in FIG. 1. This lower arm 129 is formed with a lug 131 which engages a stationary stop means 132 carried by the camera.

Parallel to the bottom wall 133 of the camera housing 100 there is an elongated releasable lock means 134 formed with an elongated horizontal slot receiving a stationary guide pin 135 and also coacting with a stationary stop member 136, so that through these components the elongated lock means 134 is guided for movement between the locking position thereof shown in FIG. 1 and the unlocking position thereof shown in FIGS. 2 and 3. The bottom wall 133 is provided with a boss 137 on the top surface of which the elongated lock means 134 rests so as to be guided also by the boss 137. A spring 138 is operatively connected with the lock means 134 to urge the latter toward its unlocking position.

At its right portion, as viewed in FIGS. 1–3, the elongated lock means 134 has a manually-engageable element 139 formed of plastic and having a suitably knurled or grooved engaging surface 140 the arrangement and shape of which is such that it is located at the exterior of the camera and can readily be engaged by the operator of the camera. Moreover, this engaging surface 140 of the operating element 139 of the releasable lock means is shaped in such a way that when the lock means is in its unlocking position shown in FIGS. 2 and 3 this surface 140 forms the part of the rounded camera corner 141, so that the lock means harmonizes with the exterior surface of the camera without projecting beyond the latter particularly when the lock means is in its unlocking position. This lock means has at its element 139 a camming projection 143 situated at the front surface 142 of element 139 and a camming groove 145 situated at the top surface 144 of the element 139, and since the purpose of these camming portions are not part of the present invention they are not further described.

At its left end region, as viewed in the drawings, the elongated lock means 134 has an inclined portion 146 which at its right end terminates in an angled lug 147 providing the mutually perpendicular locking and stop surfaces 148 and 149 which respectively coact with the locking and stop surfaces 108 and 110 of the manually operable means 102. Thus it will be noted that the surfaces 108 and 148 extend horizontally while the surfaces 149 and 110 extend vertically. Also, the elongated lock means 134 carries at its left end a pair of vertically extending lugs 150 and 151 which define between themselves an elongated space 152. The dimensions of the lug 150 is such that it will coact with the lug 131 of the motion-transmitting means 125 in a manner described below.

The operation of the above structure is as follows:

When the parts are in the rest position of FIG. 1 and the operator wishes to make an exposure, the operator will first press the key 103 in the direction of the arrow A downwardly with respect to the opening 105 in opposition to the spring 116. Thus, the manually operable means 102 will now move downwardly so that the stop surface 110 thereof moves downwardly beyond the stop surface 149, and in this way the lock 134 is released to the force of the spring 138 which now moves the lock means 134 to the right, as viewed in FIGS. 1–3, to the unlocking position shown in FIGS. 2 and 3. Shortly before the released lock means 134 reaches its unlocking position, the lug 150 thereof engages the lug 131 of the motion-transmitting means 125 and displaces the slot 126 thereof along the pin 124 so as to bring the lug 128 into engagement with the edge 113 of the projection 112. This shifting movement of the transmission means 125 takes places in opposition to the force of the spring 130. The parts now have the position shown in FIG. 2.

Now the operator will release the key 103 so that the spring 116 displaces the manually operable means 102 upwardly to its operative position shown in FIG. 3. The movement at this time will be in the direction of the arrow C shown in FIG. 2. As soon as the edge 113 moves upwardly beyond the lug 128 the spring 130 acts to return the slot 126 along the pin 124 to the position shown in FIG. 3, the lever 125 now turning about its point of engagement between the lug 131 and the lug 150. In this way the lug 128 becomes situated beneath the edge 114 of the projection 112 and against the edge 115. Thus, the motion-transmitting means 125 has now been located in a position where it will transmit motion from the manually operable means 102 to the actuating means 122.

Now when the operator depresses key 103 in the direction of arrow E, the actuating means 122 will be displaced downwardly in opposition to the spring 123 to bring about the required functions of the additional camera components which are not illustrated. During this downward movement of the actuating means 122 the lug 131 will be received in the space 152 between the lugs 150 and 151 of releasable lock means 134. Therefore, even after a relatively small downward movement of the actuating means 122 if the operator should seek to return the lock means 134 in the direction of the arrow D of FIG. 3 back toward its locking position, the lug 151 will displace the lug 131 into engagement with the stop means 132, so that it is not possible to return the lock means 134 to its locking position once the manually operable means 102 has been displaced downwardly from the position thereof shown in FIG. 3 even through a relatively short distance.

After the exposure has been made if the camera is to be returned to its position of non-use, the operator will press the lock means 134 in the direction of the arrow D shown in FIG. 3, with the manually operable means 102 in its operating position shown in FIG. 3. In this way during the first phase of this return operation the lug 150 moves away from and releases the lug 131 and now the spring 130 will swing the motion-transmitting lever 125 about the pin 124 so that the lug 128 of the upper lever arm 127 moves beyond the operating range of the horizontal edge 114 of the projection 112, and thus the transmission of motion from the manually operable means 102 to the actuating means 122 is no longer possible.

During the second phase of the return of the lock means 134 to its locking position the inclined part 146 thereof rides along the inclined edge 111 of the part 109 of the manually operable means 102, displacing the entire manually operable means 102 downwardly in opposition to the spring 116 so as to return the key 103 into the interior of the camera housing.

During the last phase of the return of the lock means 134 to its locking position, the stop surface 149 snaps behind the stop surface 110 while the lock surface 108 of the manually operable means engages the lock surface 148 of the angled end region 147 of the inclined portion 146, so that the parts again have the position shown in FIG. 1.

A renewed actuation of the key 103 will again return the parts to their operative positions as described above.

The above-described structure of the invention is suitable particularly as an improvement of the structure shown in German Pat. No. 1,280,041.

What is claimed is:

1. In a camera, support means, actuating means guided by said support means for movement from a rest position to actuate a camera component, manually operable means also supported for movement by said support means, said manually operable means having a retracted inoperative rest position and an extended operative starting position where said manually operable means is displaced away from said retracted inoperative rest position thereof, means operatively connected with said manually operable means for displacing the latter from said retracted inoperative rest position to said extended operative starting position, and motion-transmitting means carried by said actuating means and coacting with said manually operable means for providing transmission of motion from said manually operable means to said actuating means only when said manually operable means has been displaced from said inoperative rest position to said operative starting position thereof, said motion-transmitting means having with respect to said manually operable means a position incapable of transmitting motion from said manually operable means to said actuating means when said manually operable means is in said retracted inoperative rest position thereof.

2. The combination of claim 1 and wherein a connecting means connects said motion-transmitting means to said actuating means for shifting and swinging movement relative thereto.

3. In a camera, support means, actuating means guided by said support means for movement from a rest position to actuate a camera component, manually operable means also supported for movement by said support means, said manually operable means having an inoperative rest position and an operative position where said manually operable means is displaced away from said inoperative rest position thereof, and motion-transmitting means carried by said actuating means and coacting with said manually operable means for providing transmission of motion from said manually operable means to said actuating means only when said manually operable means has been displaced from said inoperative to said operative position thereof, connecting means connecting said motion-transmitting means to said actuating means for shifting and swinging movement relative thereto, said motion-transmitting means being in the form of a two-armed lever formed with an elongated opening which forms part of said connecting means, said actuating means carrying a pin which extends into said elongated opening so that said lever is shiftable along said pin and turnable there about, said manually operable means having a projection against which an arm of said lever is swingable, and releasable lock means releasably holding said manually operable means in said inoperative position thereof, said manually operable means coacting with said lock means for releasing the latter for movement to an unlocking position, and said lock means when moving to said unlocking position thereof engaging said lever for swinging the latter against said projection of said manually operable means, spring means urging said manually operable means to said operative position thereof when said manually operable means is unlocked by said lock means, said projection of said manually operable means then moving beyond said lever and said lock means swinging said lever to a position where said projection of said manually operable means will act through said lever on said actuating means to displace the latter when said manually operable means is again moved from said operative toward said inoperative position thereof.

4. The combination of claim 3 and wherein said manually operable means has a pair of mutually perpendicular stop and lock surfaces and said lock means also has a pair of mutually perpendicular stop and lock surfaces respectively coacting with said surfaces of said manually operable means for locking the latter in said inoperative position thereof while stopping said lock means from movement to said unlocking position thereof.

5. The combination of claim 4 and wherein said manually operable means and lock means respectively have inclined surfaces coacting with each other during return of said lock means toward said locking position thereof for displacing said manually operable means to said inoperative position thereof and for placing said mutually perpendicular surfaces of said lock means respectively in engagement with said mutually perpendicular surfaces of said manually operable means.

6. The combination of claim 5 and wherein said lock means has a pair of lugs one of which engages said lever to displace the latter against said projection of said manually operable means when said lock means moves toward said unlocking position thereof, said lever having a lug engaged by said one lug of said lock means, and said lugs of said lock means defining between themselves a space into which said lug of said lever is displaced during movement of said actuating means after said projection of said manually operable means moves beyond said lever, and stop means carried by said support means in the path of movement of said lug of said lever after the latter has been moved together with said actuating means by said manually operable means so that if an attempt is made to return said lock means toward said locking position thereof after said manually operable means has been displaced from said operative toward said inoperative position thereof while acting through said motion-transmitting means on said actuating means, said lug of said lever will engage said stop means to prevent return of said lock means to said locking position thereof.

7. The combination of claim 6 and wherein said support means includes a camera wall, said lock means having an elongated configuration extending parallel to said camera wall and situated adjacent thereto, said lock means having an exterior manually-engageable portion situated at the exterior of the camera without extending beyond an outer surface thereof with said manually-engageable portion of said lock means harmonizing with the exterior surface of the camera when said lock means is in said unlocking position thereof.

* * * * *